(12) United States Patent
Eidt

(10) Patent No.: US 6,260,045 B1
(45) Date of Patent: Jul. 10, 2001

(54) METHOD AND APPARATUS FOR OPTIMIZING INTERFACE DISPATCHING IN AN OBJECT-ORIENTED PROGRAMMING ENVIRONMENT

(75) Inventor: Erik L. Eidt, Campbell, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/083,518

(22) Filed: May 22, 1998

(51) Int. Cl.[7] ........................................... G06F 17/30
(52) U.S. Cl. .................. 707/103; 707/4; 707/8; 707/102; 707/200
(58) Field of Search ......................... 707/103, 102, 707/8, 4, 200

(56) References Cited

U.S. PATENT DOCUMENTS

| | | | |
|---|---|---|---|
| 5,542,078 | * | 7/1996 | Martel et al. ........................ 395/600 |
| 5,721,854 | * | 2/1998 | Ebcioglu et al. .................... 395/379 |
| 5,765,159 | * | 6/1998 | Srinivasan ........................... 707/102 |
| 5,842,220 | * | 11/1998 | De Groot et al. ................... 707/103 |
| 5,870,742 | * | 2/1999 | Chang et al. ........................... 707/8 |
| 5,872,969 | * | 2/1999 | Copeland et al. ................... 395/671 |
| 5,960,197 | * | 9/1999 | Segnan ................................ 395/702 |
| 5,974,256 | * | 10/1999 | Matthews et al. .................. 395/705 |
| 6,016,495 | * | 1/2000 | McKeehan et al. ................ 707/103 |
| 6,066,181 | * | 5/2000 | DeMaster ................................ 717/5 |

* cited by examiner

*Primary Examiner*—John Breene
*Assistant Examiner*—Cheryl Lewis
(74) *Attorney, Agent, or Firm*—Blakely, Sokoloff, Taylor & Zafman (57) ABSTRACT

A method and apparatus perform optimizations for interface dispatching in an object-oriented programming environment. Specifically, section of code that dispatches an interface method on a particular object is determined. A table of interfaces associated with the class is examined to locate the interface specified by the dispatch. An offset for a location of the interface is determined, and the offset is cached in a class cache. The class cache is then examined when a next dispatch is received to determine whether the interface associated with the offset in the class cache matches the interface specified by the next dispatch.

18 Claims, 9 Drawing Sheets

METHOD AND APPARATUS FOR OPTIMIZING INTERFACE DISPATCHING IN AN OBJECT-ORIENTED PROGRAMMING ENVIRONMENT

FIELD OF THE INVENTION

The present invention relates to the field of object-oriented programming. Specifically, the present invention relates to a method and apparatus for optimizing interface dispatching in an object-oriented programming environment.

BACKGROUND OF THE INVENTION

In object-oriented programming, an "object" is a software package that contains a collection of related procedures (or "methods") and data (or "variables"). A "class" is a template that defines the methods and variables to be included in a particular object.

Once a base class is defined, any number of unique "instances" of the class may be created. The class defines the characteristics shared by all the instances, while the instance itself contains the information that makes the instance unique.

Inheritance is a mechanism whereby a new class of objects can be defined as a special case of a more general class. The new class automatically includes (or "inherits") the method and variable definitions of the general class. Special cases of a class are known as "subclasses" of that class. In addition to the methods and variables they inherit, subclasses may define their own methods and variables and may override any of the inherited characteristics. Inheritance is thus essentially a mechanism for extending an application's functionality by reusing the functionality in the parent classes.

Interfaces are fundamental in object-oriented systems. Objects are known only through their interfaces. An object's interface characterizes the complete set of requests that can be sent to the object, or methods recognized and implemented by the object. An object's interface says nothing about its implementation, i.e. different objects are free to implement different requests differently.

"Implementation inheritance" defines an object's implementation in terms of another object's implementation, i.e. implementation inheritance defines a new implementation in terms of one or more existing implementations. Implementation inheritance is thus essentially a mechanism for code and representation sharing. In contrast, "interface inheritance" (or subtyping) describes when an object can be used in place of another, i.e. interface inheritance defines a new interface in terms of one or more existing interfaces.

Figure 1A:
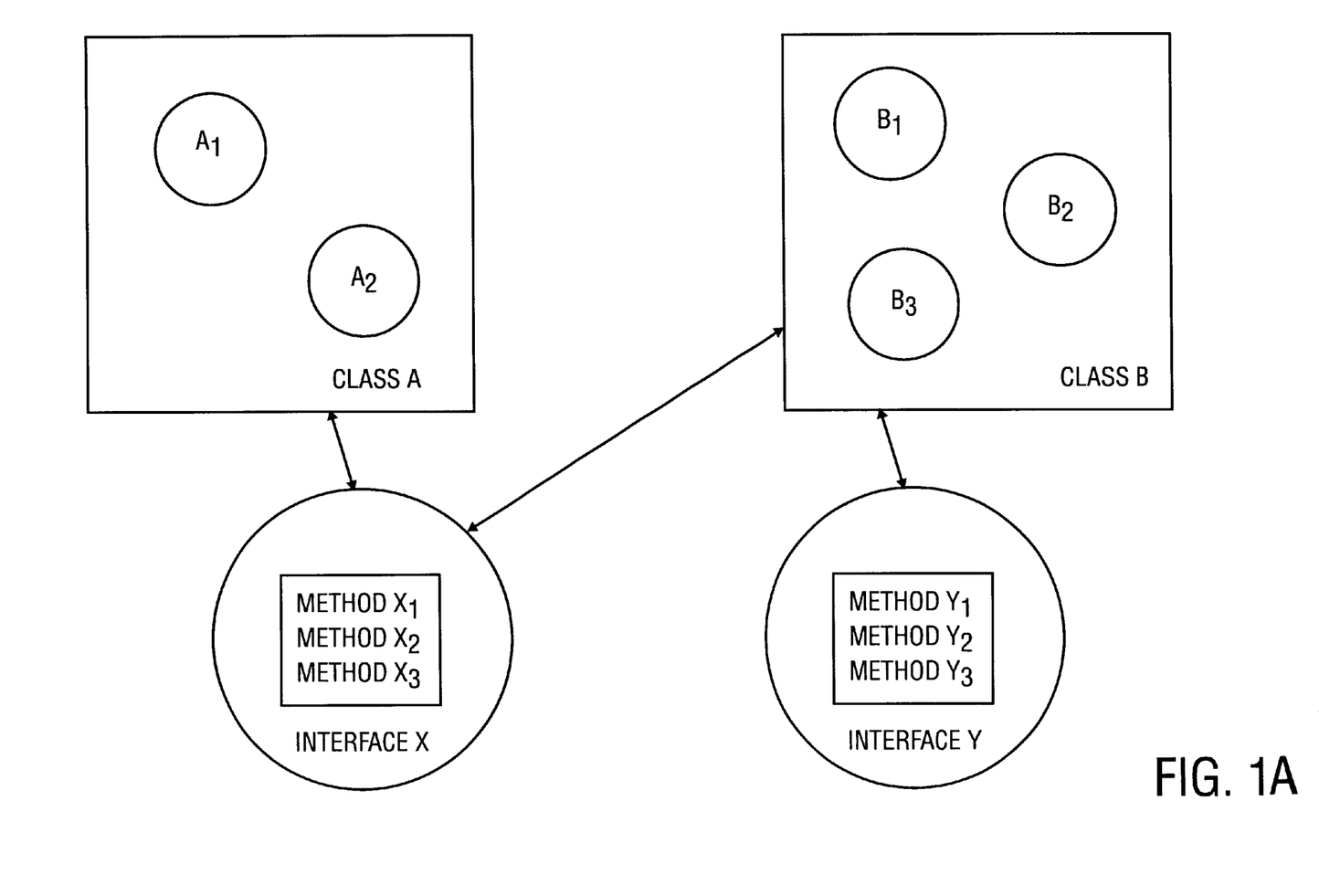
FIG. 1A illustrates an overview of object oriented programming concepts.

FIG. 1A illustrates an overview of object oriented programming concepts. Specifically, FIG. 1A illustrates two classes, Class A and Class B, each comprising multiple objects. Objects $A_1$ and $A_2$ are each instances of Class A and inherit all characteristics of Class A. Each object may also override any or all of the inherited characteristics. Similarly, Objects $B_1$, $B_2$ and $B_3$ are instances of Class B and inherit all characteristics of Class B and may override any or all of the inherited characteristics. Class A also inherits from Interface X, where Interface X implements multiple methods. Class B inherits from both Interface X and Interface Y, where each interface implements multiple methods. Objects in Class A therefore recognize Methods $X_1$, $X_2$ and $X_3$, while objects in Class B recognize Methods $X_1$, $X_2$, $X_3$, $Y_1$, $Y_2$ and $Y_3$.

In languages like C++, inheritance means both interface and implementation inheritance. The standard way to inherit an interface in C++ is to inherit publicly from a class that has (pure) virtual member functions. Pure interface inheritance can be approximated in C++ by inheriting publicly from pure abstract classes. Pure implementation or class inheritance can be approximated with private inheritance. In languages like Smalltalk, on the other hand, inheritance means implementation inheritance only. Instances of any class may be assigned to a variable as long as those instances support the operations performed on the value of the variable.

In contrast with C++ and Smalltalk, in a programming environment such as Java™, interface inheritance and implementation inheritance are treated distinctly differently. The issues facing a programmer in any of these object oriented programming environments, however, remain similar. The present specification assumes an interface inheritance mechanism implemented in Java. The description is, however, also applicable to a C++ or Smalltalk programming environment, with minor modifications.

Figure 1B:
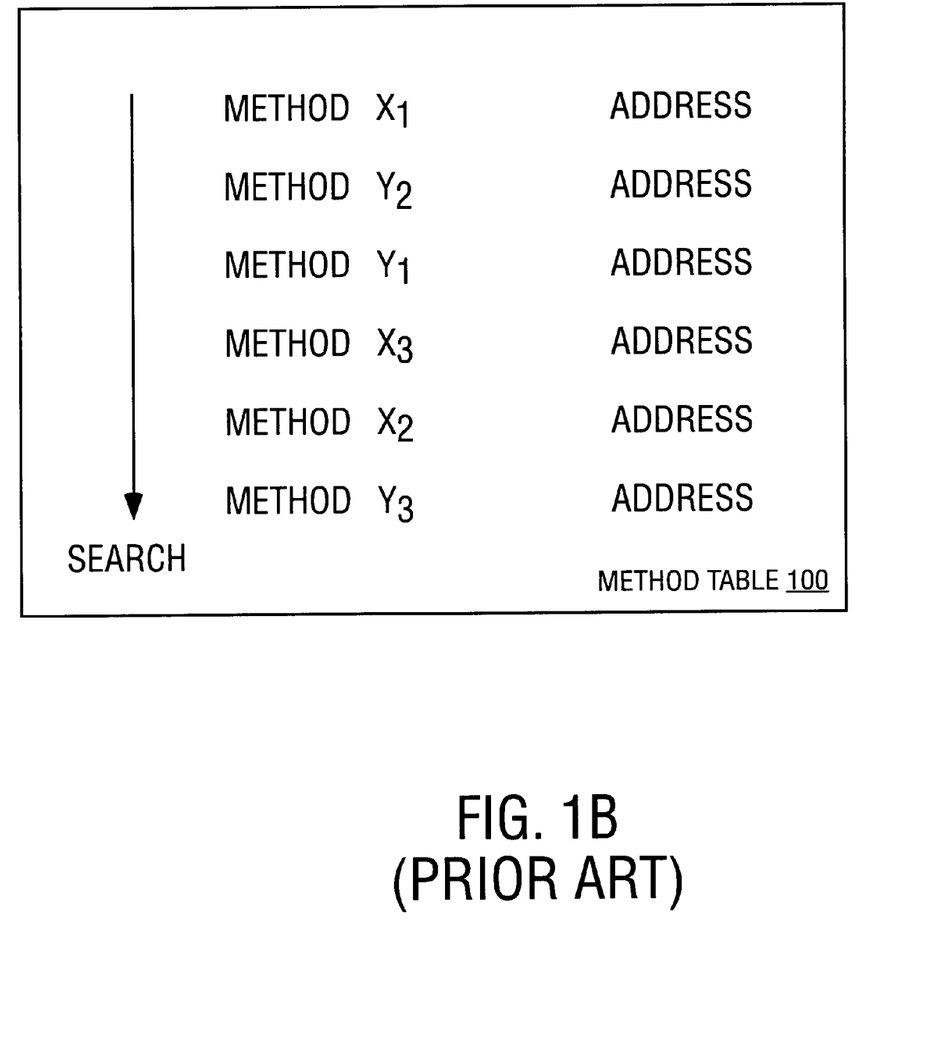
FIG. 1B illustrates conceptually the problem of determining whether an object implements a specific method.

Interface inheritance generally requires a mechanism to locate appropriate information about an interface with respect to the object being dealt with. For example, a mechanism is required to determine whether an object implements a specific method. FIG. 1B illustrates this problem conceptually. If "Method $X_3$" is called in Object $A_1$, then a method table, method table 100, is accessed to determine whether Object $A_1$ may implement Method $X_3$. In order to find Method $X_3$, method table 100 is searched in a linear, sequential manner.

Thus, as illustrated in this example, the search goes through each method in method table 100 and locates Method $X_3$. Then, based on the address for Method $X_3$, the method can be invoked. Note that Object $A_1$ does not inherit from Interface Y, and thus half the methods in the method table are not applicable to Object $A_1$. Given that a class can implement as many interfaces as a programmer chooses, searching for a specific method potentially involves checking all methods for each interface the object class implements for a match. This may result in a time-consuming loop to search for the item required.

SUMMARY OF THE INVENTION

The present invention discloses a method and apparatus for optimizing interface inheritance in an object-oriented programming environment. Specifically, an object specifying a method is examined and a class to which the object belongs is determined. A table of methods associated with the class is examined to locate the method specified by the object. An offset for a location of the interface within the class to which it belongs is determined, and the offset is cached in a class cache. The class cache is then examined when a next object is received to determine whether the interface associated with the offset in the class cache matches an interface specified by the next interface dispatch to an object of that class.

BRIEF DESCRIPTION OF THE DRAWINGS

The present invention is illustrated by way of example and not by way of limitation in the figures of the accompanying drawings in which like reference numerals refer to similar elements and in which.

DETAILED DESCRIPTION

The present invention discloses a method and apparatus for optimizing interface dispatching in an object-oriented programming environment. In the following detailed description, numerous specific details are set forth in order to provide a thorough understanding of the present invention. It will be apparent to one of ordinary skill in the art that these specific details need not be used to practice the present invention. In other instances, well-known structures, interfaces, and processes have not been shown in detail in order not to unnecessarily obscure the present invention.

Figure 2:
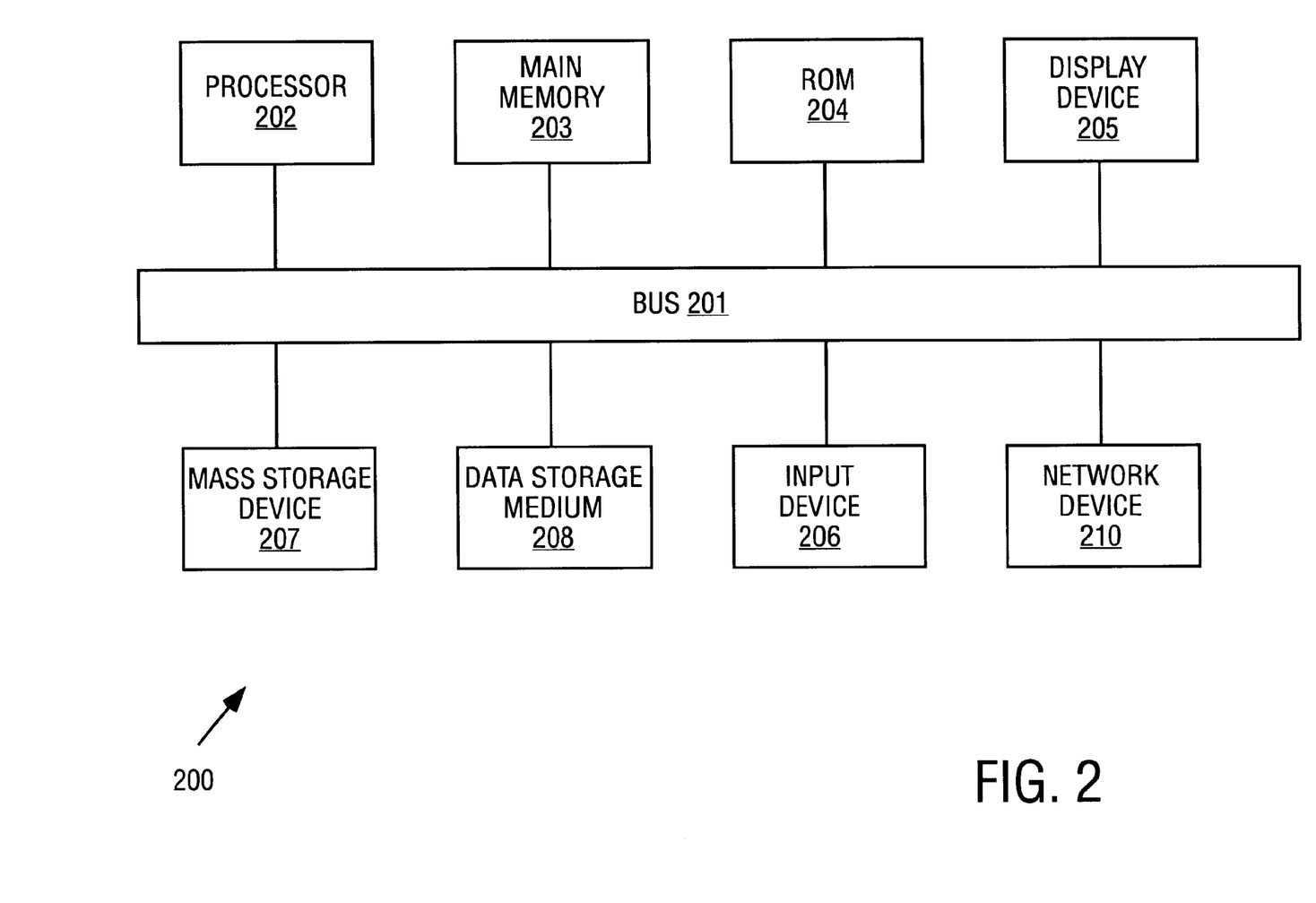
FIG. 2 illustrates a typical computer system 200 in which the present invention operates.

FIG. 2 illustrates a typical computer system 200 in which the present invention operates. One embodiment of the present invention is implemented on a personal computer architecture. It will be apparent to those of ordinary skill in the art that other alternative computer system architectures may also be employed.

In general, such computer systems as illustrated by FIG. 2 comprise a bus 201 for communicating information, a processor 202 coupled with the bus 201 for processing information, main memory 203 coupled with the bus 201 for storing information and instructions for the processor 202, a read-only memory 204 coupled with the bus 201 for storing static information and instructions for the processor 202, a display device 205 coupled with the bus 201 for displaying information for a computer user, an input device 206 coupled with the bus 201 for communicating information and command selections to the processor 202, and a mass storage device 207, such as a magnetic disk and associated disk drive, coupled with the bus 201 for storing information and instructions. A data storage medium 208 containing digital information is configured to operate with mass storage device 207 to allow processor 202 access to the digital information on data storage medium 208 via bus 201.

Processor 202 may be any of a wide variety of general purpose processors or microprocessors such as the PowerPC® processor available from Motorola Corporation of Schaumburg, Ill. It will be apparent to those of ordinary skill in the art, however, that other varieties of processors may also be used in a particular computer system. Display device 205 may be a liquid crystal display (LCD), cathode ray tube (CRT), or other suitable display device. Mass storage device 207 may be a conventional hard disk drive, floppy disk drive, CD-ROM drive, or other magnetic or optical data storage device for reading and writing information stored on a hard disk, a floppy disk, a CD-ROM a magnetic tape, or other magnetic or optical data storage medium. Data storage medium 208 may be a hard disk, a floppy disk, a CD-ROM, a magnetic tape, or other magnetic or optical data storage medium.

In general, processor 202 retrieves processing instructions and data from a data storage medium 208 using mass storage device 207 and downloads this information into random access memory 203 for execution. Processor 202, then executes an instruction stream from random access memory 203 or read-only memory 204. Command selections and information input at input device 206 are used to direct the flow of instructions executed by processor 202. Equivalent input device 206 may also be a pointing device such as a conventional mouse or trackball device. The results of this processing execution are then displayed on display device 205.

Computer system 200 includes a network device 210 for connecting computer system 200 to a network. Network device 210 for connecting computer system 200 to the network includes Ethernet devices, phone jacks and satellite links. It will be apparent to one of ordinary skill in the art that other network devices may also be utilized.

Figure 3A:
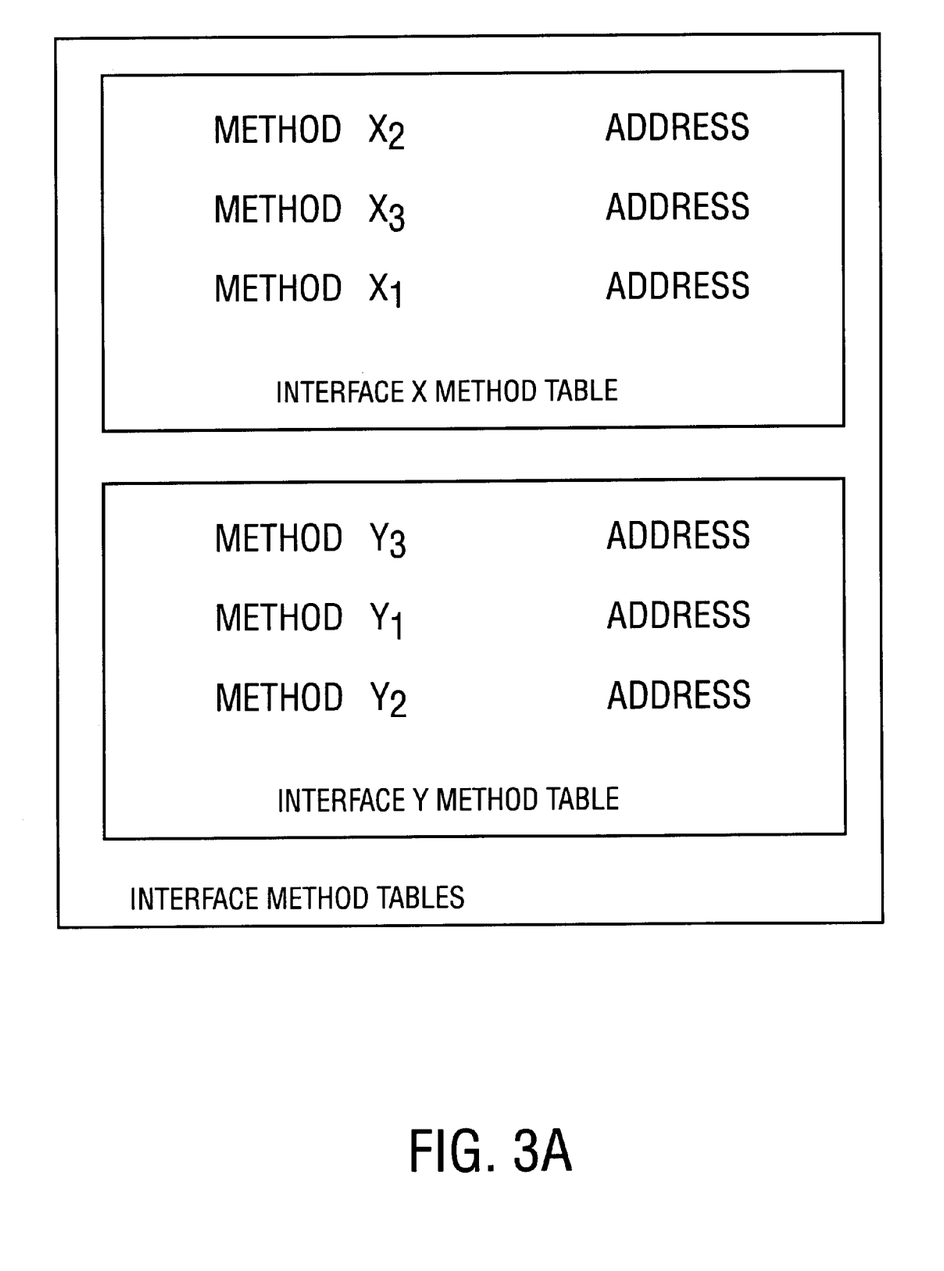
FIG. 3A is one embodiment of an interface method table.

One optimization utilized by programmers to improve the mechanism to locate appropriate information about an interface with respect to an object is to implement an interface method table. FIG. 3A illustrates an interface method table. Instead of a large table that includes all methods implemented by all interfaces in a program, as in FIG. 1B above, interface method table 300 includes multiple smaller tables that each contain only the methods implemented by a specific interface. Thus, instead of a loop that searches all methods in a method table, the loop may search only the appropriate interface table for the methods pertaining to the object. In the example of FIG. 1B above, the loop now may only search Interface X method table because Object $A_1$ only implements Interface X. As compared to the search in FIG. 1B, the amount of time required to search for the method is significantly reduced.

Figure 3B:
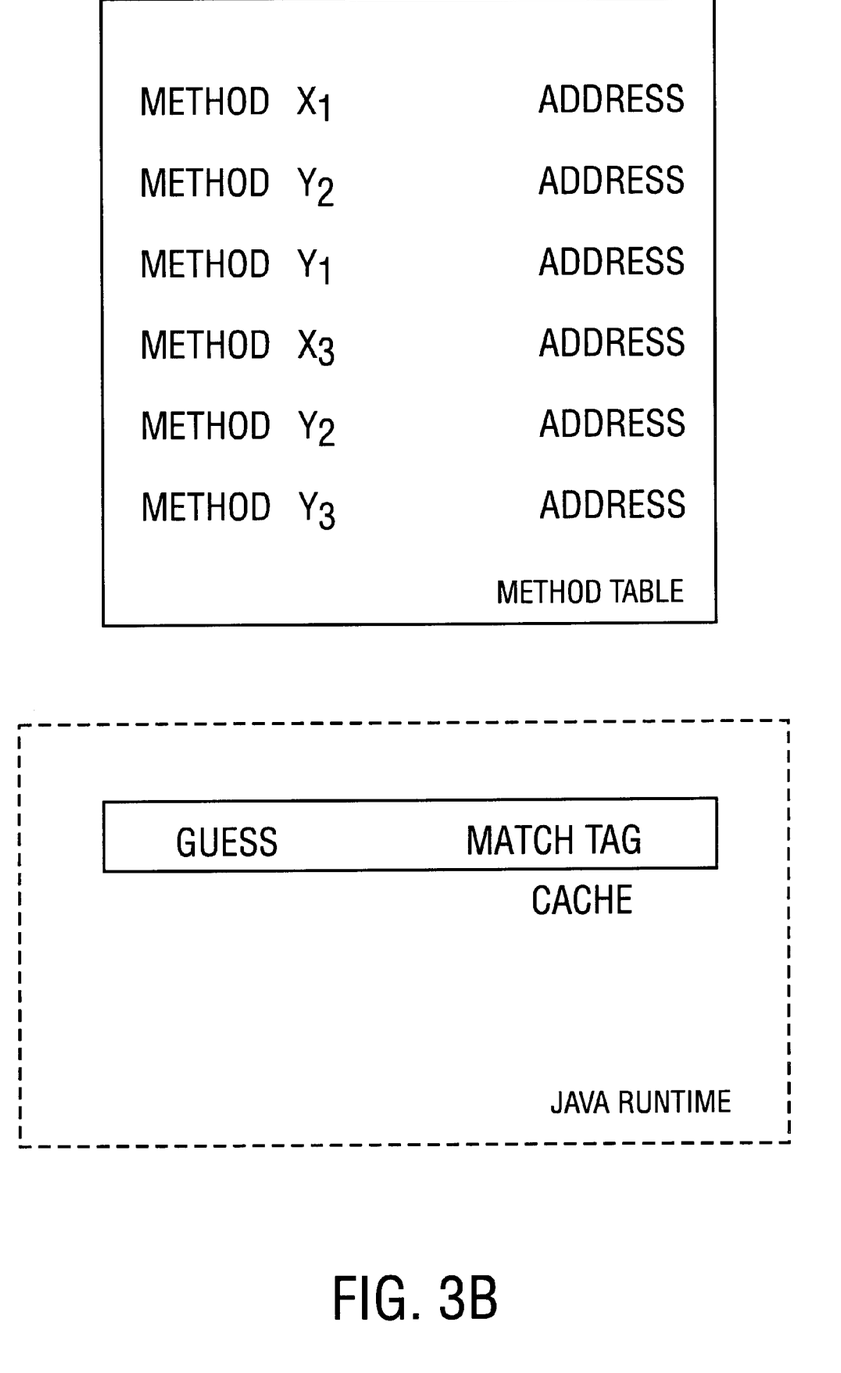
FIG. 3B illustrates a cache that stores a "match tag" and a "guess," provided by the Sun Java Runtime.

Sun's Java Virtual Machine describes an alternative optimization, namely a caching optimization. As illustrated in FIG. 3B, the Sun Java Runtime provides a cache that stores a "match tag" and a "guess." Instead of searching the method table or the interface method table, the cache is checked first to see if the guess is correct. If the guess is correct, the cached guess value is updated. If the guess is not correct, then the object's method table is searched for the appropriate entry. If found, then the cached guess value is updated. Although this provides for an improved performance in searching for a method, there is still its significant performance lag and the cache hit rate may not improve significantly given that each interface method dispatch does its own independent caching.

Figure 4:
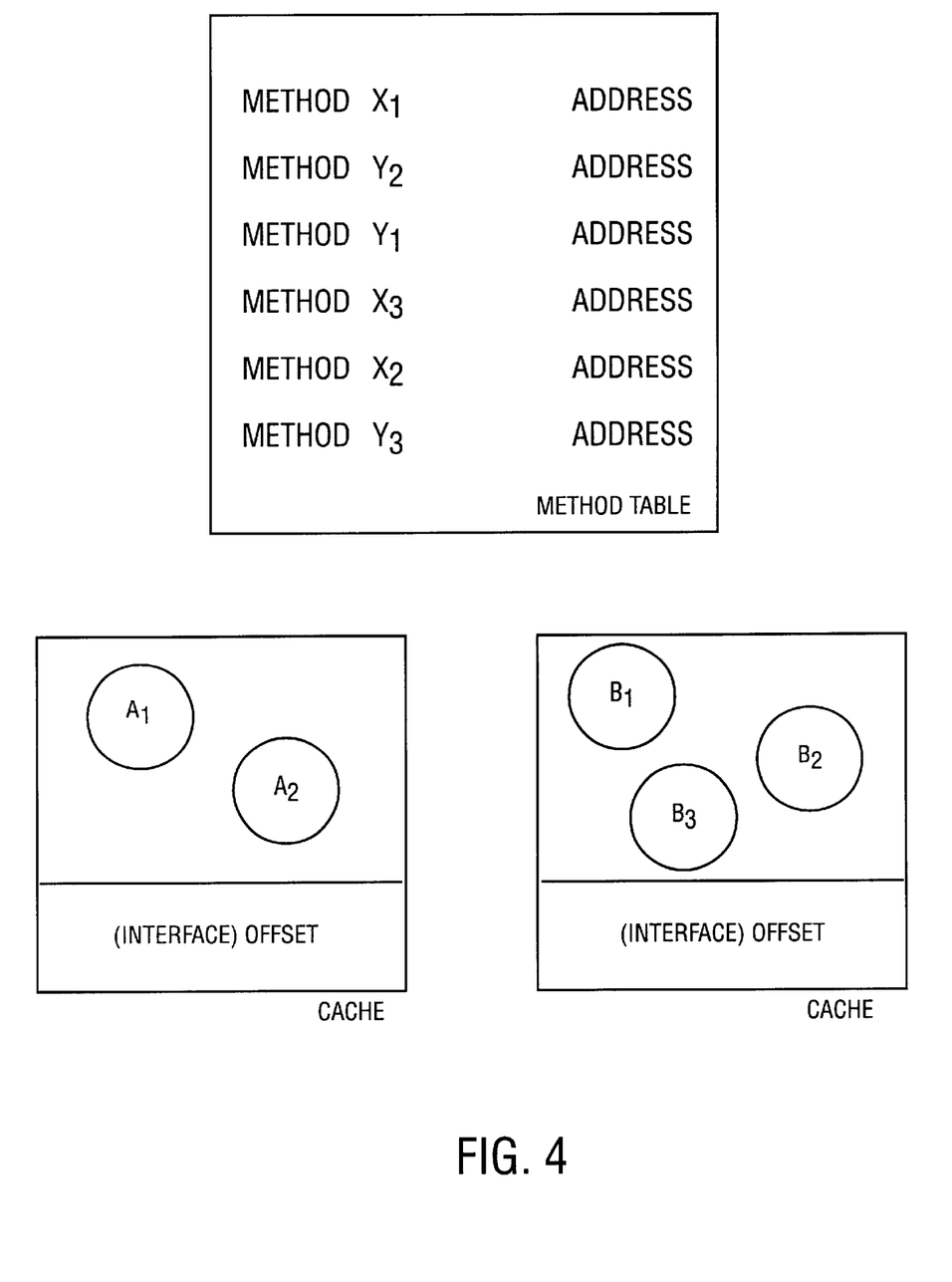
FIG. 4 illustrates conceptually the cache according to the present embodiment.

According to one embodiment of the present invention, an improved caching mechanism is provided to optimize return information so that subsequent queries of the same value produce results quicker. According to this embodiment, a one element cache is provided per class, that implements any interface. The one element cache is then shared by all instance objects of a given class. FIG. 4 illustrates conceptually the cache according to the present embodiment.

By caching interface locations within a class, interface locations can be shared amongst uses of multiple members of the same interface. Each time an interface lookup is performed, the object's class cache is checked. If the desired interface is found in the cache, then its cached location within the class is returned. If the desired interface is not found, a loop search for the interface is performed. If the loop search finds the item (implying the cached entry did not), then the entry is stored back into the cache (overriding any previous entry) before being returned.

Given that any thread in the system may be performing a different interface lookup query on the same class, i.e., using the same cache, at the same time, the cache must be maintained as if multiple readers and multiple writers are using it. Since the one element cache contains two pieces of data (the interface identifier as the match target, and the interface number within the class as the return value), each item is stored as a 16-bit value and read or written together as a single 32-bit word. This avoids the need for explicit synchronization while checking entries in the cache.

According to one embodiment, if the class implements only one interface, then that entry is placed directly into the cache, and the class list that is searched when the cache is missed is set to zero. Thus, the class interface cache is pre-primed, which avoids the initial priming during run time execution. Additionally, according to an alternate embodiment, by removing the implemented interface from the list, the negative search case (when the programmer tests if an object is not an instance of an interface) is helped as well. Many interfaces are implemented by custom classes that have been created just to support that interface. This increases the likelihood that a class will implement only one interface.

According to yet another embodiment, the list of interfaces implemented by a class is presorted by the number of methods in the interface. This moves interfaces which have no methods to the end of the list. These kinds of interfaces are often never involved in the interface lookup operation. When a class supports more than one interface, this sorting makes it faster to find those involved in interface lookup operations.

Figure 5:
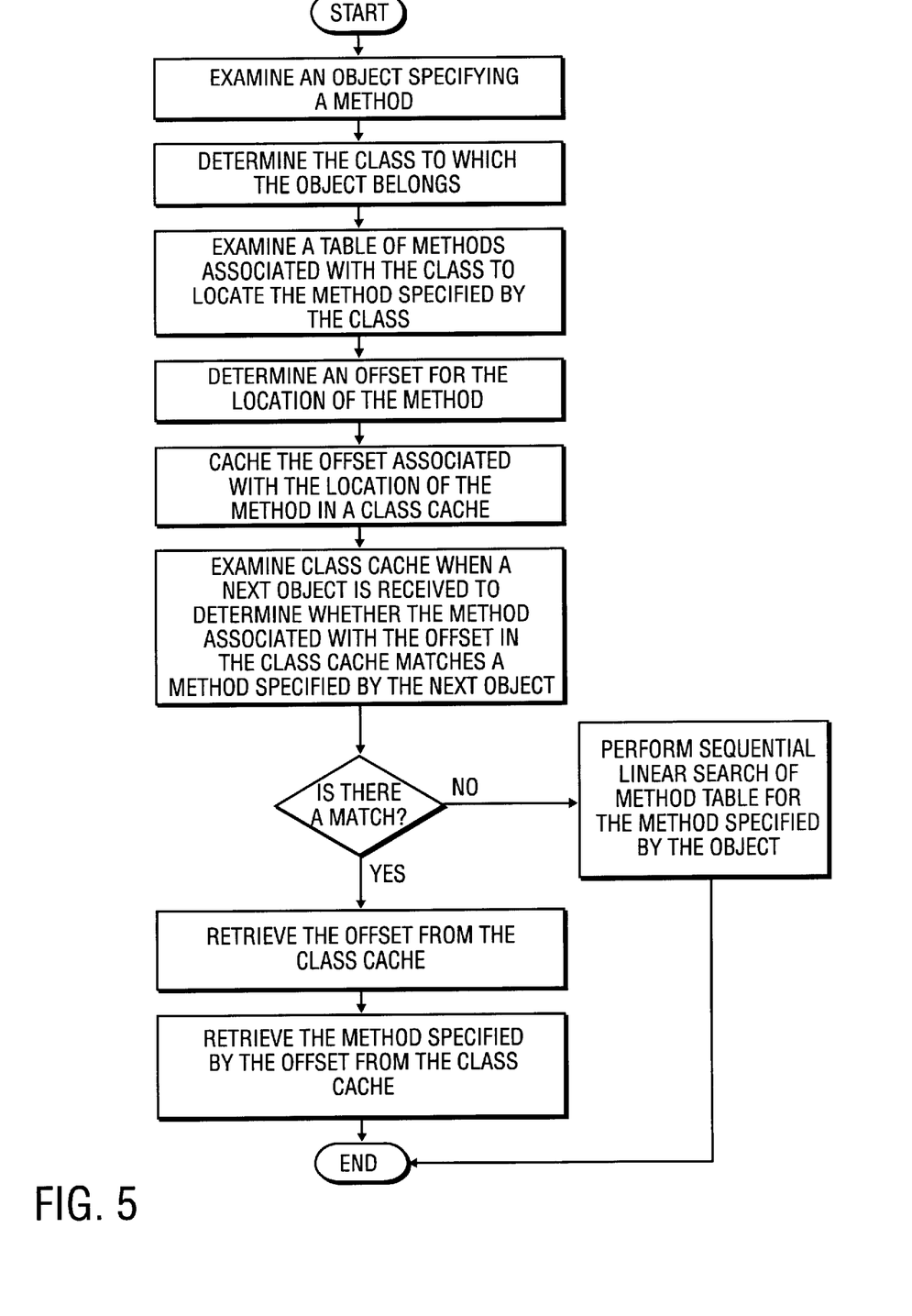
FIG. 5 is one embodiment of a flow diagram of one embodiment of the present invention.

FIG. 5 is a flow diagram of one embodiment of the present invention. In step 502, am object specifying a method is examined. The class to which the object belongs is determined in step 504, and a table of methods associated with the class is then examined to locate the method specified by the object in step 506. In step 508, an offset is determined for a location of the interface, and the offset associated with the location of the interface is then cached in a class cache in step 510. In step 512, the class cache is examined when a next object is received to determine whether the interface associated with the offset in the class cache matches the interface specified by the next interface dispatch.

Figure 6A:
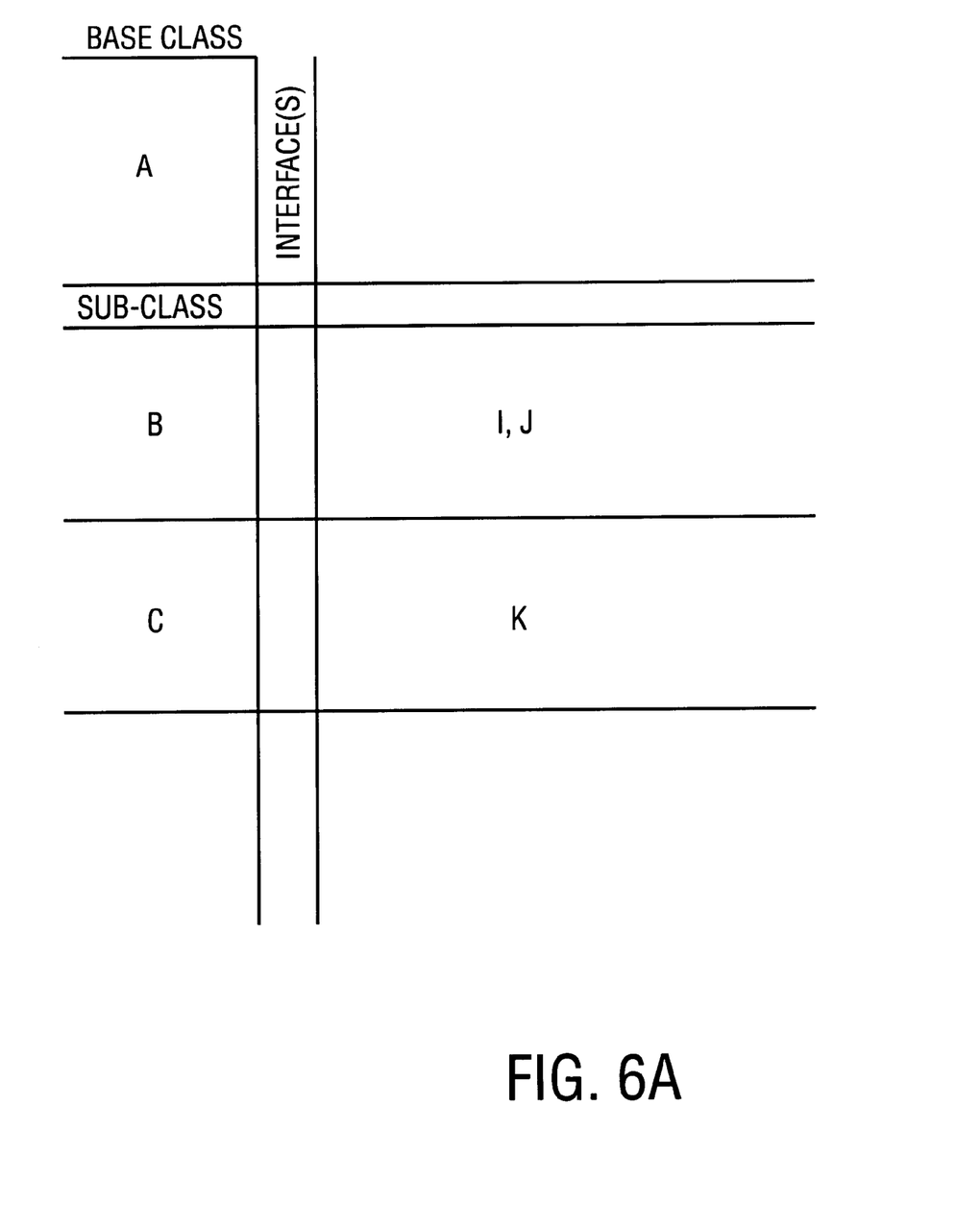
FIG. 6A is one embodiment of a class and interfaces implemented by sub-classes.

FIG. 6A is one embodiment of a class and interfaces implemented by subclasses. In the example of FIG. 6A, Class A is a base class and Sub-Classes B and C are sub-classes from Class A inheriting the method and variable definitions of Class A. Sub-Class B implements interfaces I and J and Sub-Class C implements interface K in addition to interfaces I and J inherited from Sub-Class B.

Figure 6B:
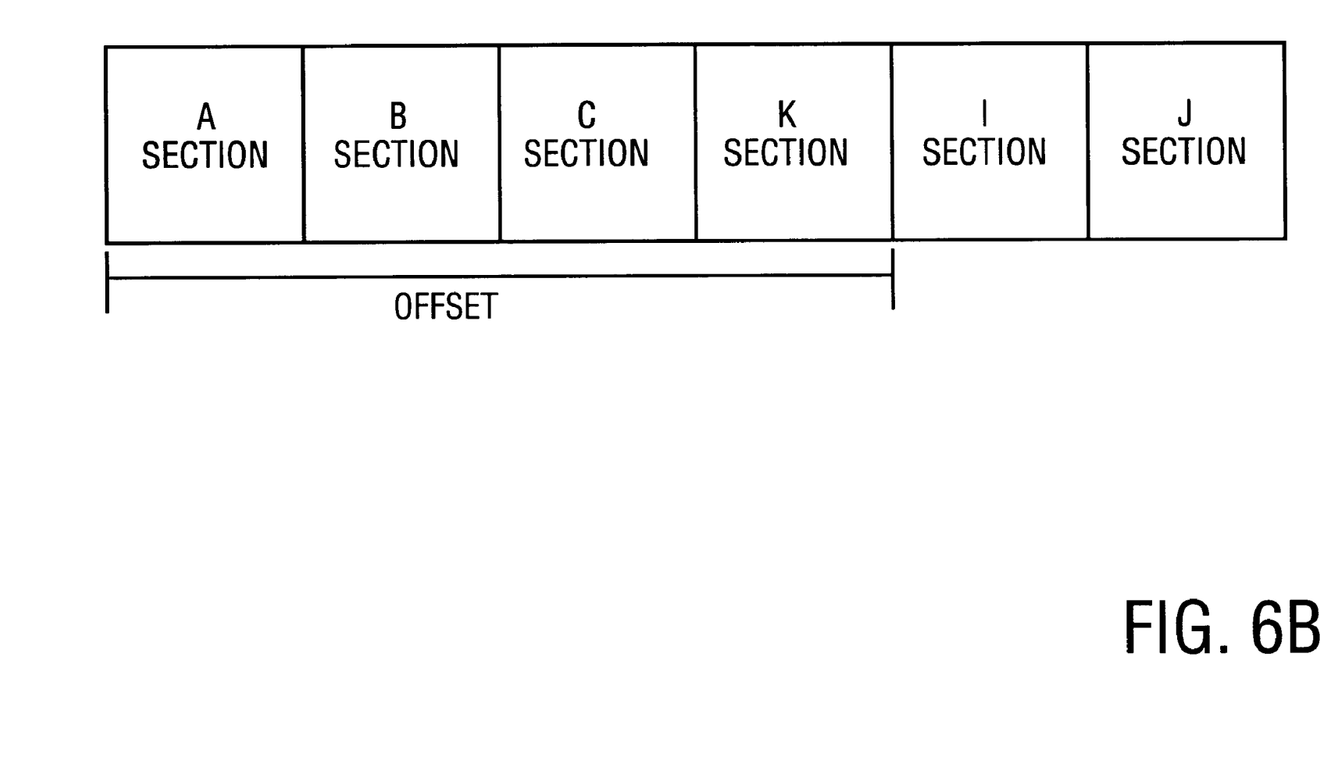
FIG. 6B is one embodiment of a v-table for objects of type C as defined in FIG. 6A.

FIG. 6B is one embodiment of a v-table for objects of type C (e.g., objects of Sub-Class C) as defined in FIG. 6A. In the v-table entry of FIG. 6B, each section includes a set of slots corresponding to the methods of that section. It is important to note that the order of the class and sub-class sections of the v-table of FIG. 6B is important. The order of the sub-classes indicates inheritance information based on the class and sub-classes "higher" in the v-table.

The order of the sections representing interfaces is not important so long as the offset from a class and/or sub-class and the interface(s) is known and consistent. Thus, offset values for a class or sub-class indicate the location of an interface in the v-table. In the v-table layout of FIG. 6B, a method "B.ml" has a slot in the B section. The method "B.m1" also has a slot in any of the interface sections where the interface declares an "m1" method. In one embodiment, offset values indicate the beginning of a referenced interface in the v-table.

In one embodiment, each object has a slot at a known offset (e.g., 0 or −4) that indicates an object identifier (ObjID) for the object. In one embodiment, the object identifier has a fixed part and a variable length part. The fixed part of the object identifier contains information including, but not limited to, a pointer indicating an interface table, the number of interfaces implemented by the associated class, an interface dispatch cache, a pointer to additional information about the class, etc.

Thus, a method and apparatus for optimizing interface inheritance in an object-oriented programming environment is disclosed. These specific arrangements and methods described herein are merely illustrative of the principles of the present invention. Numerous modifications in form and detail may be made by those of ordinary skill in the art without departing from the scope of the present invention. Although this invention has been shown in relation to a particular preferred embodiment, it should not be considered so limited. Rather, the present invention is limited only by the scope of the appended claims.

What is claimed is:

1. A computer-implemented method for optimizing interface inheritance in an object-oriented programming environment, the computer-implemented method comprising:

examining an object specifying a method;

determining a class to which the object belongs;

examining a table of methods associated with the class to locate the method specified by the object;

determining an offset for a location of the method;

caching in a class cache the offset associated with the location of the method; and examining the class cache when a next object is received to determine whether the method associated with the offset in the class cache matches a method specified by the next object.

2. The computer-implemented method according to claim 1 wherein the class cache resides with the class to which the object belongs.

3. The computer-implemented method according to claim 1 wherein the step of examining the table of interfaces associated with the class to locate the interface specified by the dispatch includes the step of examining a table of interfaces associated with the class to locate the interface specified by the object.

4. The computer-implemented method according to claim 1 further including retrieving the offset from the class cache when the method associated with the offset in the class cache matches the method specified by the next object.

5. The computer-implemented method according to claim 4 further including retrieving the method specified by the offset from the class cache.

6. The computer-implemented method according to claim 4 further including performing a linear search of a method table when the method specified by the next object does not match the method associated with the offset in the class cache.

7. A machine readable medium having stored thereon data representing sequences of instructions, which when executed by a computer system, cause said computer system to:

examine an object specifying a method;

determine a class to which the object belongs;

examine a table of methods associated with the class to locate the method specified by the object;

determine an offset for a location of the method;

cache in a class cache the offset associated with the location of the method; and examine the class cache when a next object is received to determine whether the method associated with the offset in the class cache matches a method specified by the next object.

8. The machine readable medium according to claim 7 wherein the class cache resides with the class to which the object belongs.

9. The machine readable medium according to claim 7 further including sequences of instructions, which when executed by the computer system, cause the computer system to examine a table of interface methods associated with the class to locate the method specified by the object.

10. The machine readable medium according to claim 7 further including sequences of instructions, which when executed by the computer system, cause the computer system to retrieve the offset from the class cache when the method associated with the offset in the class cache matches the method specified by the next object.

11. The machine readable medium according to claim 10 further including sequences of instructions, which when executed by the computer system, cause the computer system to retrieve the method specified by the interface offset from the class cache.

12. The machine readable medium according to claim 10 further including sequences of instructions, which when executed by the computer system, cause the computer system to perform a linear search of a method table when the method specified by the next object does not match the method associated with the offset in the class cache.

13. An apparatus for optimizing interface inheritance in an object-oriented programming environment, comprising:

a readable medium having encoded therein a plurality of programming instructions designed to enable the apparatus, when the programming instructions are executed on behalf of a client, to examine an object specifying a method, determine a class to which the object belongs, examine a table of methods associated with the class to locate the method specified by the object, determine an offset for a location of the method, cache in a class cache the offset associated with the location of the method, and examine the class cache when a next object is received to determine whether the method associated with the offset in the class cache matches a method specified by the next object; and a processor coupled to the readable medium to execute the plurality of programming instructions.

14. The apparatus of claim 13, wherein the plurality of instructions include further instructions for residing said class cache within the class to which the object belongs.

15. The apparatus of claim 12, wherein the instructions for examining the table of methods associated with the class to locate the method specified by the object include further instructions to enable the apparatus to:

examine a table of interface methods associated with the class to locate the method specified by the object.

16. The apparatus of claim 13, wherein the plurality of instructions include further instructions to enable the apparatus to:

retrieve the offset from the class cache when the method associated with the offset in the class cache matches the method specified by the next object.

17. The apparatus of claim 16, wherein the plurality of instructions include further instructions to enable the apparatus to:

retrieve the method specified by the offset from the class cache.

18. The apparatus of claim 16, wherein the plurality of instructions include further instructions to enable the apparatus to:

perform a linear search of a method table when the method specified by the next object does not match the method associated with the offset in the class cache.

* * * * *